United States Patent
Moriyama et al.

(10) Patent No.: US 6,571,090 B1
(45) Date of Patent: May 27, 2003

(54) RADIO RECEIVER AND DIVERSITY RECEIVER

(75) Inventors: Yukihiro Moriyama, Kawasaki (JP); Saburo Kamei, Kawasaki (JP); Haruhiro Noma, Nishinomiya (JP); Kouzou Tokuyama, Nishinomiya (JP); Kazuhiko Nobunaga, Nishinomiya (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 09/613,613

(22) Filed: Jul. 11, 2000

(30) Foreign Application Priority Data

Oct. 6, 1999 (JP) .......................................... 11-285976

(51) Int. Cl.⁷ ................................................ H04B 7/02
(52) U.S. Cl. ..................... 455/277.1; 455/132; 375/347
(58) Field of Search ................................. 455/132, 133, 455/65, 272, 273, 275, 277.1, 277.2, 562; 375/347

(56) References Cited

U.S. PATENT DOCUMENTS

| | | | |
|---|---|---|---|
| 5,488,638 A | * 1/1996 | Kazecki et al. | 375/347 |
| 6,023,615 A | * 2/2000 | Bruckert et al. | 455/277.2 |
| 6,091,788 A | * 7/2000 | Keskitalo et al. | 375/347 |
| 6,415,141 B1 | * 7/2002 | Kakura et al. | 455/277.1 |

* cited by examiner

Primary Examiner—Lee Nguyen
(74) Attorney, Agent, or Firm—Katten Muchin Zavis Rosenman

(57) ABSTRACT

The present invention relates to a radio receiver or a diversity receiver where reception waves respectively reaching a plurality N of branches in parallel are cyclically selected at a first frequency equal to a value of the product of a symbol frequency, the plurality N being a total number of branches, and a prescribed number E equal to or greater than "2", the instantaneous values of selected reception waves are sequentially sampled at a second frequency equal to or higher than the first frequency, and a resulting sequence of instantaneous values is cyclically split at the first frequency, whereby sequences of instantaneous values individually corresponding to the plurality N of reception waves are output. In a radio transmission system applying the above radio receiver or diversity receiver, reception waves reaching a plurality of branches are received in parallel without largely increasing hardware in scale.

15 Claims, 11 Drawing Sheets

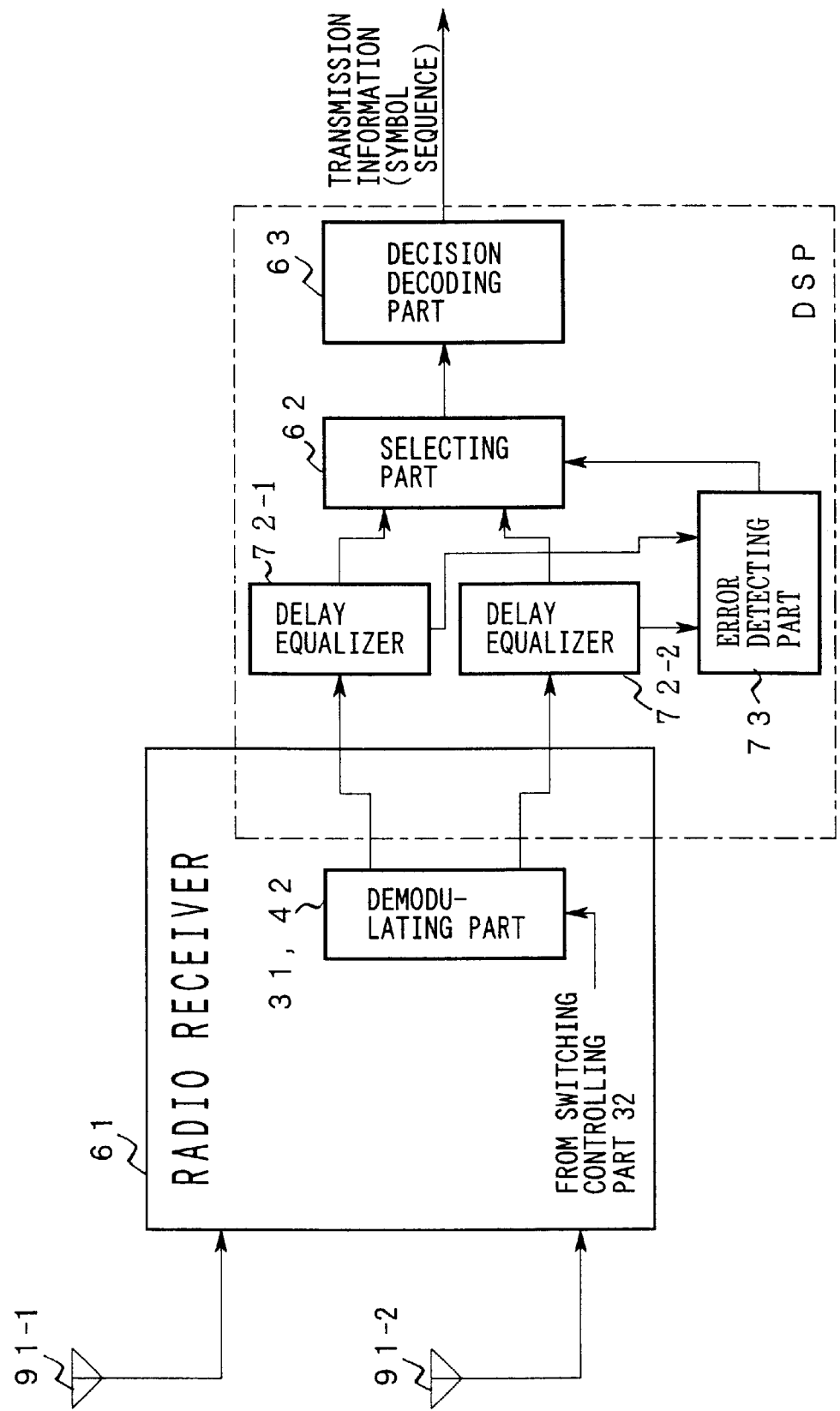

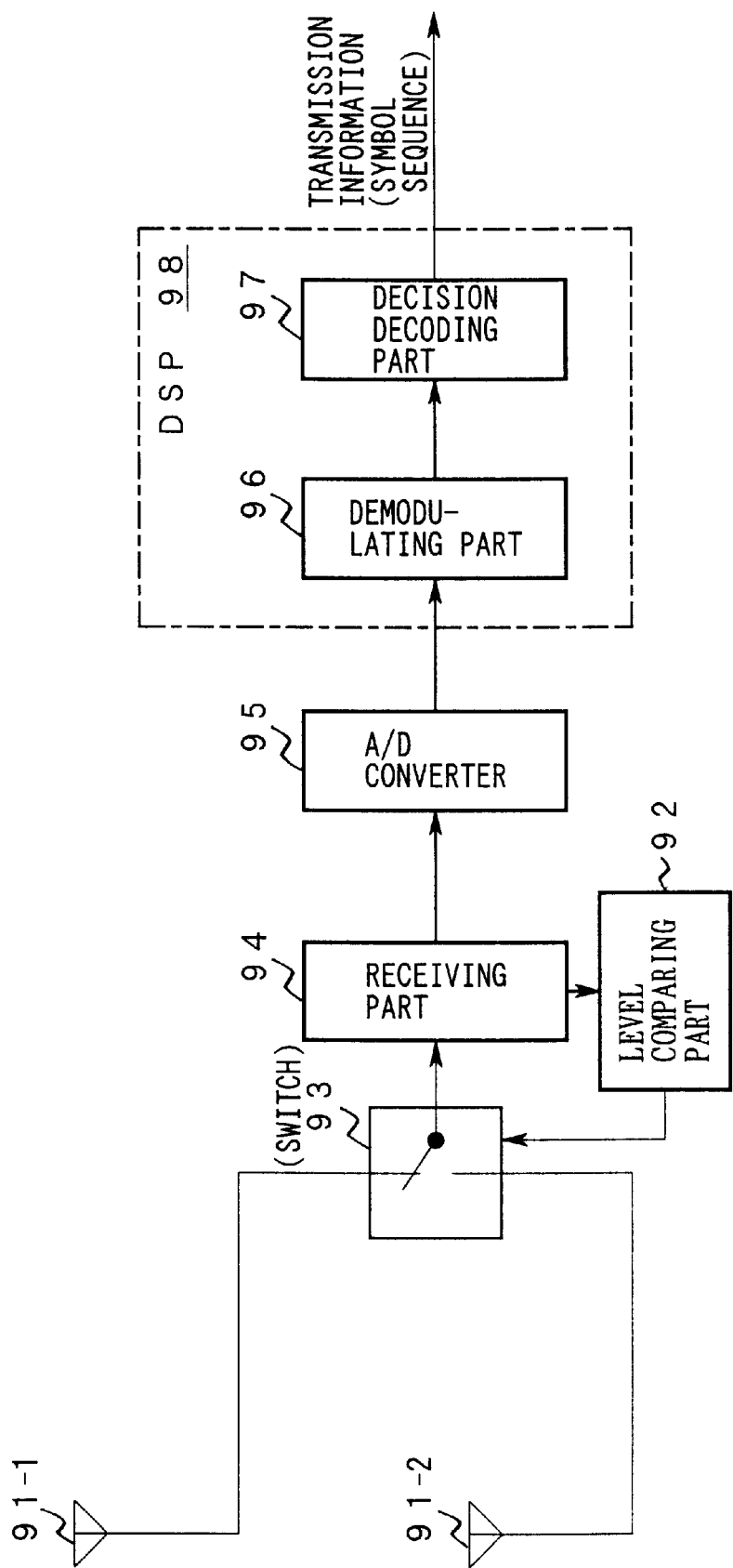

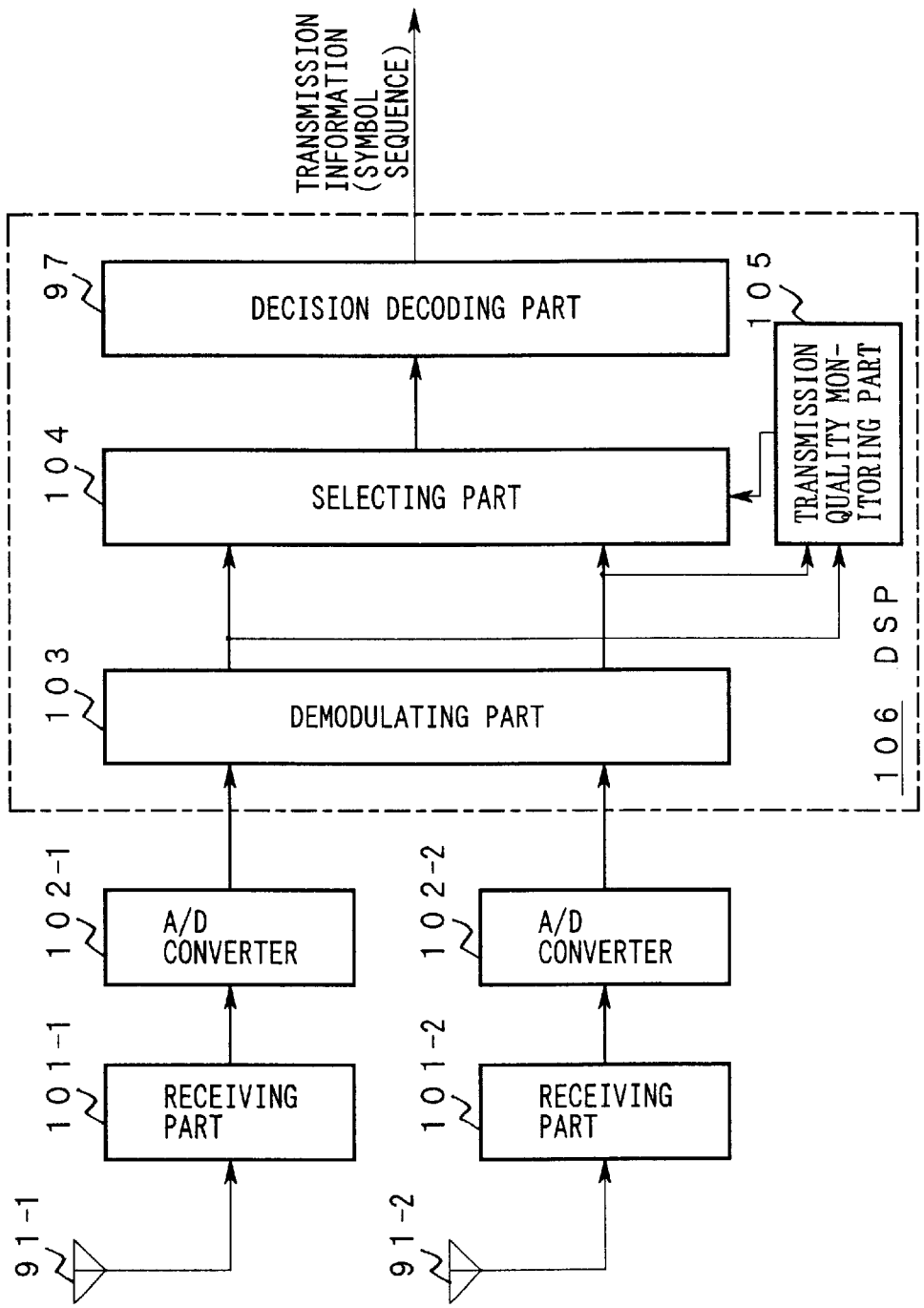

RADIO RECEIVER AND DIVERSITY RECEIVER

BACKGROUND OF THE INVENTION

1. Field of the Invention

The present invention relates to a radio receiver that receives, in parallel, reception waves respectively reaching branches and a diversity receiver that is incorporated in such a radio receiver.

2. Description of the Related Art

In general, in mobile communication systems, the landforms and planimetries around the radio base station and the mobile station vary every moment as the mobile station (including the vehicle) moves and hence a multipath is formed in a complicated manner and the transmission characteristic of the radio transmission channel vary to a large extent.

Therefore, to maintain desired transmission quality by reducing the degree of fading that is caused by the above-mentioned variation in transmission characteristic, a diversity receiving method is frequently used in mobile stations that access such a mobile communication system.

FIG. 10 shows the configuration of a first conventional diversity receiver.

As shown in FIG. 10, the feeding point of an antenna 91-1 is connected to one contact of a switch 93 and the feeding point of an antenna 91-2 is connected to the other contact of the switch 93. The common contact of the switch 93 is connected to the input of a receiving part 94, and the RSSI output of the receiving part 94 is connected to the control input of the switch 93 via a level comparing part 92. The output of the receiving part 94 is connected to the input of a decision decoding part 97 via an A/D converter 95 and a demodulating part 96 that are cascaded. Transmission information as symbol sequence (described later) appears at the output of the decision decoding part 97.

In the diversity receiver having the above configuration, the switch 94 selects one of reception waves reaching the respective antennas 91-1 and 91-2.

The receiving part 94 generates an intermediate frequency signal by frequency-converting and amplifying the selected reception wave. Further, the receiving part 94 measures the level of the selected reception wave and supplies a measurement result to the level comparing part 92.

Comparing the reception wave level thus supplied with a prescribed lower limit value, the level comparing part 92 requests the switch 93 to select the other reception wave when the reception wave level becomes lower than the lower limit value.

The A/D converter 95 generates, in the intermediate frequency domain or the baseband domain, a digital signal corresponding to the one reception wave by sampling the intermediate frequency signal sequentially at a prescribed frequency and coding resulting individual sampling values.

The demodulating part 96 extracts components (e.g., the amplitude and phase of a subcarrier component) suitable for a modulation scheme that was used for generating the reception wave from the components of the reception wave that are represented by the digital signal.

The decision decoding part 97 sequentially recognizes sequences of those components as symbol positions having maximum likelihood based on the signal space diagram of the above-mentioned modulation scheme and restores transmission information in the form of a symbol sequence that indicates individual symbol positions in time-series order.

It is assumed that the above processing performed by the demodulating part 96 and the decision decoding part 97 is realized as a digital signal processing that is executed by a single DSP (digital signal processor) 98 as indicated by a chain line in FIG. 10.

FIG. 11 shows the configuration of a second conventional diversity receiver. The components in FIG. 11 having the same function and configuration as the corresponding components in FIG. 10 are given the same reference symbols as the latter and will not described.

The diversity receiver shown in FIG. 11 is different from the diversity receiver shown in FIG. 10 in that the level comparing part 92 and the switch 93 are not provided, that the feeding points of the antennas 91-1 and 91-2 are connected to the inputs of A/D converters 102-1 and 102-2 via receiving parts 101-1 and 101-2, respectively, that a demodulating part 103 and a selecting part 104 that are cascaded are provided interstage between the A/D converters 102-1 and 102-2 and the decision decoding part 97, that the two outputs of the demodulating part 103 are connected to the corresponding inputs of a transmission quality monitoring part 105, and that the output of the transmission quality monitoring part 105 is connected to the selection input of the selecting part 104.

In the diversity receiver having the above configuration, the receiving parts 101-1 and 101-2 convert reception waves reaching the antennas 91-1 and 91-2 into intermediate frequency signals, respectively.

The A/D converters 102-1 and 102-2 convert the intermediate frequency signals into digital signals, respectively. The demodulating part 103 extracts, in parallel, sets of components (e.g., the amplitude and phase of a subcarrier component) suitable for a prescribed modulation scheme from the sets of components of the reception waves represented by the respective digital signals. For the sake of simplicity, it is assumed here that the modulation scheme is the π/4 differential QPSK.

The transmission quality monitoring part 105 determines an error in the signal space (an error with respect to a standard value according to the above-mentioned modulation scheme), symbol by symbol, of each of the sets of components that have been extracted parallel by the demodulating part 103 and correspond to the respective reception waves that reached the antennas 91-1 and 91-2 in parallel, and sequentially computes average values of those errors.

The transmission quality monitoring part 105 outputs binary information indicating a smaller one of the average values.

The selecting part 104 selects one set of components indicated by the binary information from the sets of components that were extracted parallel by the demodulating part 103 as described above and correspond to the respective reception waves that reached the antennas 91-1 and 91-2 in parallel, and supplies the selected components to the decision decoding part 97.

That is, in the diversity receiver shown in FIG. 11, switching diversity is realized by a digital signal processing in the intermediate frequency domain through cooperation between the transmission quality monitoring part 105 and the selecting part 104.

It is assumed that the demodulating part 103, the selecting part 104, the decision decoding part 97, and the transmission quality monitoring part 105 are implemented by a single DSP (digital signal processor) 106 as indicated by a chain line in FIG. 11.

Incidentally, the diversity receiver shown in FIG. 10 is small in hardware scale and power consumption and provides high reliability at a low cost because it has only one receiving part 94 to be mounted.

However, since only one of reception waves reaching the antennas 91-1 and 91-2 in parallel is level-monitored by the level comparing part 92, it is not necessarily the case that the other reception wave has a higher level than the one reception wave.

Therefore, for example, where reception waves are given as a prescribed time slot sequence and switching is made between the contacts of the switch 93 in synchronism with those time slots, the diversity gain is not necessarily kept high when the level of a reception wave received as a certain sets of time slots rapidly decreases. In general, the diversity gain obtained by the diversity receiver shown in FIG. 10 is lower than that obtained in accordance with the post-detection diversity scheme by about 3 dB.

The diversity receiver shown in FIG. 11 provides a higher diversity gain than the diversity receiver shown in FIG. 10 as long as the two receiving parts 101-1 and 101-2 corresponding to the respective antennas 91-1 and 91-2 perform proper band limitation and amplification on reception waves in parallel.

However, having a larger hardware scale and power consumption than the diversity receiver shown in FIG. 10, the diversity receiver shown in FIG. 11 in many cases cannot be applied to, in particular, equipment such as a mobile station of a mobile communication system that should satisfy a severe requirement of power saving as well as other requirements of cost reduction, downsizing, and lightening.

SUMMARY OF THE INVENTION

An object of the present invention is to provide a radio receiver and a diversity receiver adaptable to a desired diversity receiving system with flexibility and reliability without largely increasing hardware in scale.

Another object of the invention is to commonly use a single circuit including a.means performing sampling on every reception wave reaching a plurality N of branches and to reliably perform demodulation and decision decoding as a discrete signal processing achieving the sampling theorem.

Another object of the invention is to realize demodulation and decision decoding on a plurality N of reception waves reaching a plurality N of branches as a digital signal processing performed by an information processing device for general purpose or common use.

Another object of the invention is to make reduction in hardware scale more efficient, the closer to the back stage of a branch selecting section the first stage of a circuit commonly used for a plurality N of branches is disposed.

Still another object of the invention is to reduce hardware in scale with more efficiency than in a case where sampling is performed in an intermediate frequency domain.

Yet another object of the invention is to reduce hardware in scale with more efficiency than in a case where sampling is performed in a baseband domain.

A further object of the invention is to apply the basic configuration of the present invention even to a receiving system in which a frequency allocation or a channel allocation and a heterodyne detection scheme adapted to the allocation is prevented from matching due to restraints by cost or the like.

Another object of the invention is to realize a means performing sampling and a circuit for common use including the means as circuits performing signal processing at low speed even when the radio frequency of a reception wave is high.

Another object of the invention is to realize a means performing sampling and a circuit for common use including the means as circuits performing signal processing at low speed even when the radio frequency of a reception wave and the frequency of an intermediate signal generated according to frequency conversion on the reception wave are both high.

Another object of the invention is to perform demodulation and decision decoding with stability and reliability.

Still another object of the invention is to lessen the decrease in noise figure due to either or both of a loss in the feeding paths of each branch and an insertion loss in a means for selecting one of the feeding paths, the larger the gains of an amplifying stage is, as well as to improve the transmission quality.

Yet another object of the invention is to perform receiving processing, according to a switching diversity scheme as a discrete signal processing achieving the sampling theorem, on every reception wave reaching a plurality N of branches, without large increase in hardware size.

A further object of the invention is to reliably select branch selection based on a switching diversity scheme independent of a modulation scheme as long as a symbol position is steadily given.

Another object of the invention is to flexibly adapt to a variety of frequency allocations, channel allocations, modulation schemes, multiple access schemes, and diversity schemes and to obtain high transmission quality at low cost without largely increasing hardware in scale in the receiving end of a radio transmission system.

Another object of the invention is to lighten and downsize a terminal which accesses mobile communication systems and improve the performance, so that the service quality of the mobile communication system can be enhanced.

The aforementioned objects are achieved by a radio receiver in which: reception waves individually reaching a plurality N of branches are cyclically selected at the first frequency equal to a value of the product of the plurality N, a number E equal to or greater than "2", and a symbol frequency; and the instantaneous value of selected reception waves are sampled at a second frequency that is n times the value of the first frequency (n: integer); and a resulting sequence of instantaneous values is split into a plurality N of sequences of instantaneous values individually corresponding to the branches.

In this radio receiver, a single circuit performing the above sampling is commonly used for all the plurality N of branches, and demodulation and decision decoding are reliably performed on every reception waves as a discrete signal processing based on the sampling theorem with accuracy determined by the number E and the ratio of the first frequency to the second frequency.

The aforementioned objects are achieved by a radio receiver in which the split sequences of instantaneous values are individually converted into digital signals.

In this radio receiver, demodulation and decision decoding on the plurality N of reception waves can be realized as a digital signal processing performed by an information processing device for general purpose, common use DSP, or the like.

The aforementioned objects are achieved by a radio receiver in which reception waves individually reaching a plurality N of branches are selected in the radio frequency domain or the intermediate frequency domain.

In this radio receiver, the hardware can be efficiently reduced in scale.

Furthermore, the aforementioned objects are achieved by a radio receiver in which the instantaneous values of reception waves individually reaching the plurality N of branches are sampled in the radio frequency domain.

In this radio receiver, the hardware is reduced in scale more efficiently than in a case where the above-mentioned sampling is performed in the intermediate frequency domain.

The aforementioned objects are also achieved by a radio receiver in which the instantaneous values of reception waves individually reaching the plurality N of branches are sampled in the intermediate frequency domain.

In this radio receiver, the hardware is reduced in scale more efficiently than in a case where the above-mentioned sampling is performed in the baseband domain.

The aforementioned objects are achieved by a radio receiver in which the instantaneous values of reception waves individually reaching the plurality N of branches are sampled in the baseband domain.

In this radio receiver, the present invention can be applied to a receiving system in which frequency allocation or channel allocation and a heterodyne detection scheme are prevented from matching due to restraints by cost or the like.

The aforementioned objects are achieved by a radio receiver in which the instantaneous values of reception waves individually reaching the plurality N of branches are sampled at a frequency lower than the frequency of the carrier signal of the reception waves.

In this radio receiver, a circuit including the means performing the above sampling and commonly used for the plurality N of branches is realized as a circuit performing a signal processing at low speed without use of high-speed devices even when the radio frequency of the reception waves is high.

The above-mentioned objects are achieved by a radio receiver in which the second frequency is equal to or lower than the intermediate frequency.

In this radio receiver, a circuit including the means performing sampling and commonly used for the plurality N of branches can be realized as circuits that perform a signal processing at low speed without use of high-speed devices even when the radio frequency of the reception waves and the frequency of an intermediate frequency signal are both high.

The aforementioned objects are achieved by a radio receiver in which the number E is set at a number that either or both of demodulation and decision decoding are performed with a desired accuracy.

In this radio receiver, the number E may be equal to or greater than a number that the above accuracy is to be the desired value. Therefore, the demodulation and the decision decoding are performed on every means connected in cascade to the plurality N of branches with stability and reliability as long as the speed of processing to be performed is set at a desired small value.

The aforementioned objects are achieved by a radio receiver which comprises a means disposed on the feeding paths of the plurality N of branches and amplifies in parallel the reception waves individually reaching the plurality N of branches.

In the above radio receiver, the larger the gains of the means for the above amplification are, the lower a decrease in noise figure is due to either or both of a loss in the feeding paths of the plurality N of branches and an insertion loss of the means disposed at a subsequent stage of the branches.

The aforementioned objects are achieved by a diversity receiver incorporating the above radio receiver, in which the transmission qualities of reception waves reaching each branch are monitored and a sequence of instantaneous values of a reception wave having the maximum.transmission quality is selected among the sequences of instantaneous values of the reception waves.

In this diversity receiver, a receiving processing according to a switching diversity scheme is performed on each of plurality N of reception waves as a discrete signal processing based on the sampling theorem without largely increasing hardware in size owing to common use of a single circuit including the means performing sampling.

The above objects are achieved by a diversity receiver in which errors from the proper allocation of a symbol position are monitored as the transmission quality.

In this diversity receiver, the branch selection according to the switching diversity scheme is performed with reliability independent of an applied modulation scheme as long as a symbol position is reliably given.

The above-mentioned objects are achieved by a diversity receiver in which the levels of reception waves are monitored as the transmission qualities.

In this diversity receiver, it is possible to compute the transmission qualities and realize switching diversity based on the transmission qualities with simplicity and reliability when a deterioration occurring in accordance with the errors of a phase and a frequency, of the errors in SN ratio occurring in the radio transmission paths of the reception waves individually reaching the plurality N of branches, is negligibly low and a modulation scheme in which all symbol positions in the signal space are located on a complete round whose center is the origin, is applied.

The above-mentioned objects are achieved by a diversity receiver different from the above diversity receiver in that diversity reception is performed by not selecting a branch but combining reception waves individually reaching the branches.

In this diversity receiver, a receiving processing according to a diversity scheme is performed on every reception wave as a discrete signal processing based on the sampling theorem with accuracy determined in accordance with the ratio of the first frequency to the second frequency and the number E without large increase in hardware size owing to commonly using a single circuit including the means that performs sampling.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 9 is a block diagram showing the fourth embodiment of the invention;

FIG. 10 shows the configuration of a first conventional diversity receiver; and

FIG. 11 shows the configuration of a second conventional diversity receiver.

DETAILED DESCRIPTION OF THE PREFERRED EMBODIMENTS

Figure 1:
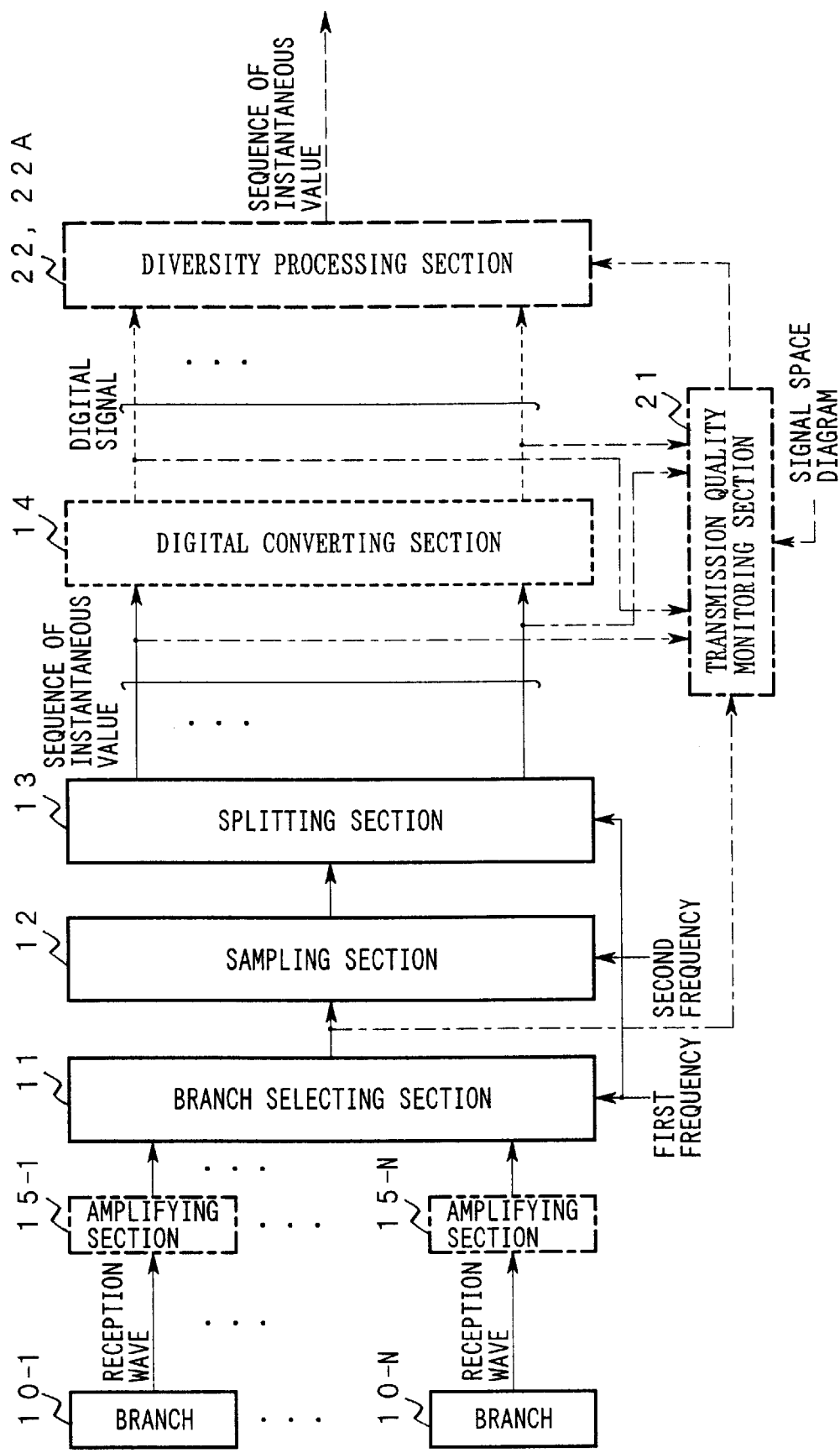
FIG. 1 is a principle block diagram of radio receivers and diversity receivers according to the invention.

First, the principles of radio receivers and diversity receivers according to the invention will be described with reference to FIG. 1. FIG. 1 is a principle block diagram of radio receivers and diversity receivers according to the invention.

As shown in FIG. 1, the diversity receivers and the radio receivers are composed of: amplifying sections 15-1 to 15-N that are connected to the feeding points of respective branches 10-1 to 10-N; a branch selecting section 11, a sampling section 12, a splitting section 13, a digital converting section 14, and a diversity processing section 22 or 22A that are cascaded and disposed in the subsequent stage of the amplifying section 15-1 to 15-N; and a transmission quality monitoring section 21 that is disposed between the outputs of the branch selecting section 11, the splitting section 13, and the digital converting section 14 and a prescribed input of the diversity processing section 22 or 22A.

The principle of a first radio receiver according to the invention is as follows.

The branch selecting section 11 cyclically selects, at a first frequency (described later), a plurality N of reception waves respectively reaching the plurality N of branches 10-1 to 10-N in parallel. The sampling section 12 sequentially samples, at a second frequency equal to or higher than the first frequency, the instantaneous values of each reception wave selected from the plurality N of reception waves by the branch selecting section 11, and outputs a sequence of instantaneous values. The splitting section 13 cyclically splits, at the first frequency, the sequence of instantaneous values output from the sampling section 12, and outputs sequences of instantaneous values individually corresponding to the plurality N of reception waves.

In this radio receiver, the first frequency is equal to a value of the product of the symbol frequency of the reception waves, the plurality N, and a prescribed number E greater than or equal to "2". That is, each of N sequences of instantaneous values that are output from the splitting section 13 is a sequence generated by sampling the corresponding one of the plurality N of reception waves at a cycle equal to or shorter than a value of the reciprocal of the first frequency.

Therefore, the single circuit including the sampling section 12 is commonly used for all the branches 10-1 to 10-N, and demodulation and decision decoding are reliably performed on each of the plurality N of reception waves as a discrete signal processing according to the sampling theorem with accuracy determined by the number E and the ratio of the first frequency to the second frequency.

The principle of a second radio receiver according to the invention is as follows.

The digital converting section 14 converts the sequences of instantaneous values respectively corresponding to the plurality N of reception waves and output from the splitting section 13, into digital signals in parallel.

In this radio receiver, demodulation and decision decoding on the plurality N of reception waves can be realized as a digital signal processing performed by an information processing device for general purpose or common use DSP.

The principle of a third radio receiver according to the invention is as follows.

The branch selecting section 11 selects the reception waves reaching the plurality N of respective branches 10-1 and 10-N in the radio frequency domain or the intermediate frequency domain.

In this radio receiver, the single circuit including the sampling section 12 and to be commonly used for the plurality N of branches 10-1 to 10-N includes a prior-stage circuit of a circuit for performing a prescribed processing on each reception wave selected by the branch selecting section 11 in the baseband domain.

Therefore, the hardware scale can be reduced more efficiently, the closer to the output end of the branch selecting section 11 the first stage of the above-mentioned single circuit is disposed.

The principle of a fourth radio receiver according to the invention is as follows.

The sampling section 12 samples the instantaneous values of reception waves selected by the branch selecting section 11 in the radio frequency domain.

In this radio receiver, the sampling section 12 is included in the single circuit to be commonly used for the plurality N of branches 10-1 to 10-N. Therefore, the hardware scale is reduced more efficiently than in a case where the sampling section 12 performs the above-mentioned sampling in the intermediate frequency domain.

The principle of a fifth radio receiver according to the invention is as follows.

The sampling section 12 samples the instantaneous values of reception waves selected by the branch selecting section 11 in the intermediate frequency domain.

In this radio receiver, the sampling section 12 is included in the single circuit to be commonly used for the plurality N of branches 10-1 to 10-N. Therefore, the hardware scale is reduced more efficiently than in a case where the sampling section 12 performs the above-mentioned sampling in the baseband domain.

The principle of a sixth radio receiver according to the invention is as follows.

The sampling section 12 samples the instantaneous values of reception waves selected by the branch selecting section 11 in the baseband domain.

In this radio receiver, the sampling section 12 is included in the single circuit to be commonly used by the plurality N of branches 10-1 to 10-N. Therefore, the processing to be performed at the final stage of the single circuit is realized as low-speed signal processing.

Therefore, the invention can be applied to a receiving system in which frequency allocation or channel allocation and a heterodyne detection scheme are prevented from matching due to restraints by the cost or the like.

The principle of a seventh radio receiver according to the invention is as follows.

The second frequency is equal to or lower than the frequency of the carrier signal of the reception waves.

In this radio receiver, the sampling section 12 samples a sequence of instantaneous values of the reception waves selected by the branch selecting section 11 at the second frequency equal to or lower than the frequency of the carrier signal of the reception wave. That is, a sequence of instantaneous values of each reception wave selected by the branch selecting section 11 is undersampled and becomes an intermediate frequency signal or a baseband signal.

Therefore, the sampling section 12 and a circuit for common use including the sampling section 12 can be realized as circuits that perform signal processing at low speed without use of high-speed devices even when the above-mentioned radio frequency is high.

The principle of an eighth radio receiver according to the invention is as follows.

The second frequency is equal to or lower than the frequency of an intermediate frequency signal generated according to frequency conversion or frequency synthesizing processing on each reception wave selected by the branch selecting section 11.

In this radio receiver, the sampling section 12 samples the instantaneous values of reception waves at the above-mentioned second frequency. That is, a sequence of the instantaneous values of reception waves selected by the branch selecting section 11 is undersampled and becomes a baseband signal.

Therefore, the sampling section 12 and a circuit for common use including the sampling section 12 can be realized as circuits that perform signal processing at low speed without use of high-speed devices even when the radio frequency of the reception waves and the frequency of the intermediate frequency signal described above are both high.

The principle of a ninth radio receiver according to the invention is as follows.

The number E is set at a number that the accuracy of one or both of demodulation and decision decoding performed in parallel on the sequences of instantaneous values respectively corresponding to the plurality N of reception waves and output from the splitting section 13, is to be a desired value.

In this radio receiver, the number E may only be set greater than or equal to a number that the above-mentioned accuracy is to be a desired value. Therefore, the demodulation and the decision decoding are stably performed with reliability as long as the speed of processing to be performed by each of the branch selecting section 11, the sampling section 12, and the digital converting section 14 is higher than or equal to a minimum speed that conforms to the above-mentioned value.

The principle of a tenth radio receiver according to the invention is as follows.

The plurality N of amplifying sections 15-1 to 15-N are disposed as prior stages of the branch selecting section 11 and respectively amplify the reception waves reaching the plurality N of branches 10-1 to 10-N.

In this radio receiver, the smaller the decrease in noise figure due to one or both of a loss in the feeding paths of the branches 10-1 to 10-N and an insertion loss of the branch selecting section 11 is, the larger the gains of the amplifying sections 15-1 to 15-N are.

The principle of a first diversity receiver according to the invention is as follows.

The branch selecting section 11 accepts a plurality N of reception waves respectively reaching in parallel a plurality N of branches and cyclically selects, at a first frequency (described later), the reception waves. The sampling section 12 sequentially samples, at a second frequency equal to or higher than the first frequency, the instantaneous values of the reception waves selected from the plurality N of reception waves by the branch selecting section 11, and outputs a sequence of the instantaneous values. The splitting section 13 cyclically splits, at the first frequency, the sequence of instantaneous values that is output from the sampling section 12, and outputs a sequence of instantaneous value individually corresponding to the plurality N of reception waves. The transmission quality monitoring section 21 analyzes the sequence of instantaneous values output from the splitting section 13 and individually corresponding to the reception waves according to a modulation scheme applied for generating the reception waves, and obtains the transmission qualities of the reception waves that are respectively represented by the sequence of instantaneous values. The diversity processing section 22 selects a sequence of instantaneous values having the maximum transmission quality obtained by the transmission quality monitoring section 21 from the sequences of instantaneous values that are output from the splitting section 13 and respectively correspond to the plurality N of reception waves.

In this diversity receiver, the first frequency is equal to a value of the product of the symbol frequency of the plurality N of reception waves individually reaching the plurality N of branches 10-1 to 10-N, the plurality N, and a prescribed number E greater than or equal to "2". Therefore, the splitting section 13 can generate a plurality N of sequences of instantaneous values whose reception waves can be individually restored based on the sampling theorem.

The transmission quality monitoring section 21 analyzes the sequences of instantaneous values that are output from the splitting section 13 and individually correspond to the plurality N of reception waves according to a modulation scheme applied for generating the reception waves, and thereby obtains the transmission qualities of the reception waves respectively represented by the sequences of instantaneous values. The diversity processing section 22 selects a sequence of instantaneous values having the maximum transmission quality from the sequences of instantaneous values output from the splitting section 13 and individually correspond to the plurality N of reception waves.

Therefore, a receiving processing according to a switching diversity scheme is performed on each of the plurality N of reception waves as discrete signal processing based on the sampling theorem with accuracy determined by the number E and the ratio of the first frequency to the second frequency without large increase in hardware size due to common use of the single circuit including the sampling section 12.

The principle of a second diversity receiver according to the invention is as follows.

The transmission quality monitoring section 21 obtains, as the transmission qualities, the degrees of errors in the signal space appropriate to the modulation scheme applied for generating the reception waves with regard to the sequences of instantaneous values output from the splitting section 13 and individually correspond to the plurality N of reception waves.

In this diversity receiver, the above-mentioned errors indicate the degrees of deterioration in SN ratio of the reception waves individually occurring in the radio transmission paths, rather than the mere levels of the reception waves reaching each branch. Therefore, the branch selection according to the switching diversity scheme is reliably performed independent of the modulation scheme applied as long as the symbol position is reliably given.

The principle of a third diversity receiver according to the invention is as follows.

The transmission quality monitoring section 21 obtains, as the transmission qualities, the levels of reception waves selected by the branch selecting section 11.

In this diversity receiver, in general, the levels of the reception waves can be obtained as an amplitude component of the reception wave or an average value of amplitude component within a time equal to or shorter than the symbol period by dedicated hardware that performs discrete signal processing or processing equivalent to it in the digital domain or the analog domain.

Therefore, it is possible to compute the above transmission qualities and realize switching diversity based on the transmission qualities with simplicity and reliability when a deterioration occurring in accordance with the errors of a phase and a frequency, of the deterioration in SN radio occurring in the radio transmission paths of the reception waves individually reaching the plurality N of branches 10-1 to 10-N is negligibly low or all symbol positions in the signal space are located on a complete round whose center is the origin, is applied.

The principle of a fourth diversity receiver according to the invention is as follows.

The branch selecting section 11 accepts a plurality N of reception waves respectively reaching in parallel a plurality N of branches 10-1 to 10-N and cyclically selects, at a first frequency (described later), the reception waves. The sampling section 12 sequentially samples, at a second frequency equal to or higher than the first frequency, the instantaneous values of the reception waves selected from the plurality N of reception waves by the branch selecting section 11, and outputs a sequence of instantaneous values. The splitting section 13 cyclically splits, at the first frequency, the sequence of instantaneous values output from the sampling section 12, and outputs sequences of instantaneous values individually corresponding to the plurality N of reception waves. The diversity processing section 22A combines the sequences of instantaneous values, output from the splitting section 13 and individually corresponding to the plurality N of reception waves, with weighting based on a prescribed sensing technique or navigation technique, and obtains a single sequence of instantaneous values.

In this diversity receiver, the first frequency is equal to a value of the product of the symbol frequency of the reception waves, the plurality N, and a prescribed number E equal to or greater than "2". Therefore, by sampling the reception waves individually reaching the branches 10-1 to 10-N at a cycle that is shorter than a value of the reciprocal of the first frequency, the splitting section 13 generates a plurality N of sequences of instantaneous values whose reception waves can be restored based on the sampling theorem.

The diversity processing section 22A combines the sequences of instantaneous values, generated from the splitting section 13 and individually corresponding to the reception waves, with weighting based on a prescribed sensing technique or navigation technique, and obtains a single seguence of instantaneous values.

Therefore, a receiving processing according to a diversity scheme is performed on each of the plurality N of reception waves as a discrete signal processing based on the sampling theorem with accuracy that is determined by the number E and the ratio of the first frequency to the second frequency without large increase in hardware size due to common use of the single circuit including the sampling section 12.

Embodiments of the invention will be hereinafter described in detail with reference to the drawings.

Figure 2:
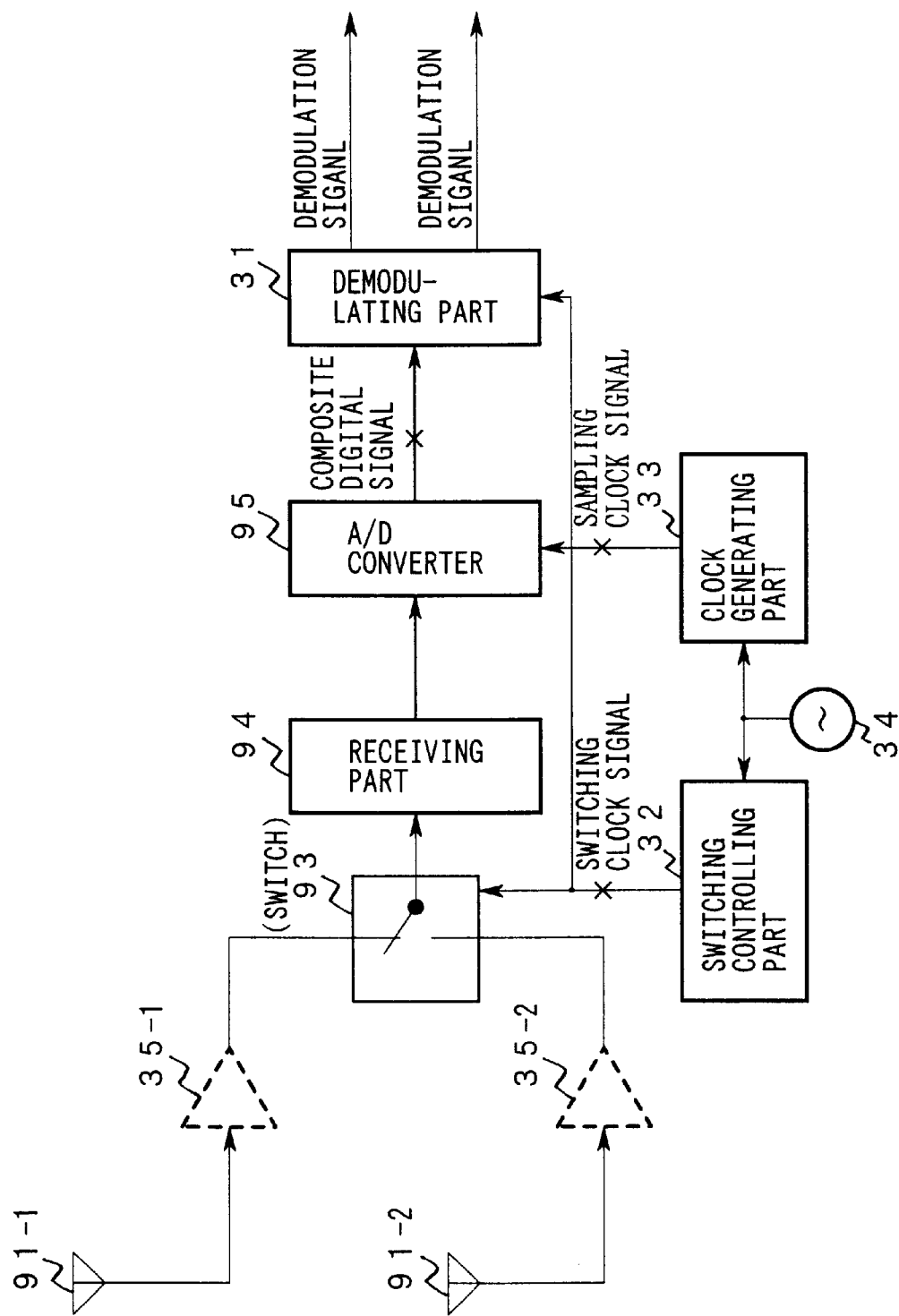
FIG. 2 is a block diagram showing a first embodiment of the invention.

FIG. 2 is a block diagram showing a first embodiment of the invention.

The components in FIG. 2 that are the same in function and configuration as the corresponding components in FIG. 10 are given the same reference symbols as the latter and will not be described.

This embodiment is different from the conventional example shown in FIG. 10 in that a demodulating part 31 having two output terminals corresponding to the respective antennas 91-1 and 91-2 is provided in place of the demodulating section 96, that a switching controlling part 32 whose output is connected to the respective control inputs of the switch 93 and the demodulating part 31 is provided in place of the level comparing part 92, that a clock generating part 33 whose output is connected to the clock terminal of the A/D converter 95 is provided, and that an oscillator 34 whose output is directly connected to the respective inputs of the switching controlling part 32 and the clock generating part 33.

Figure 3:
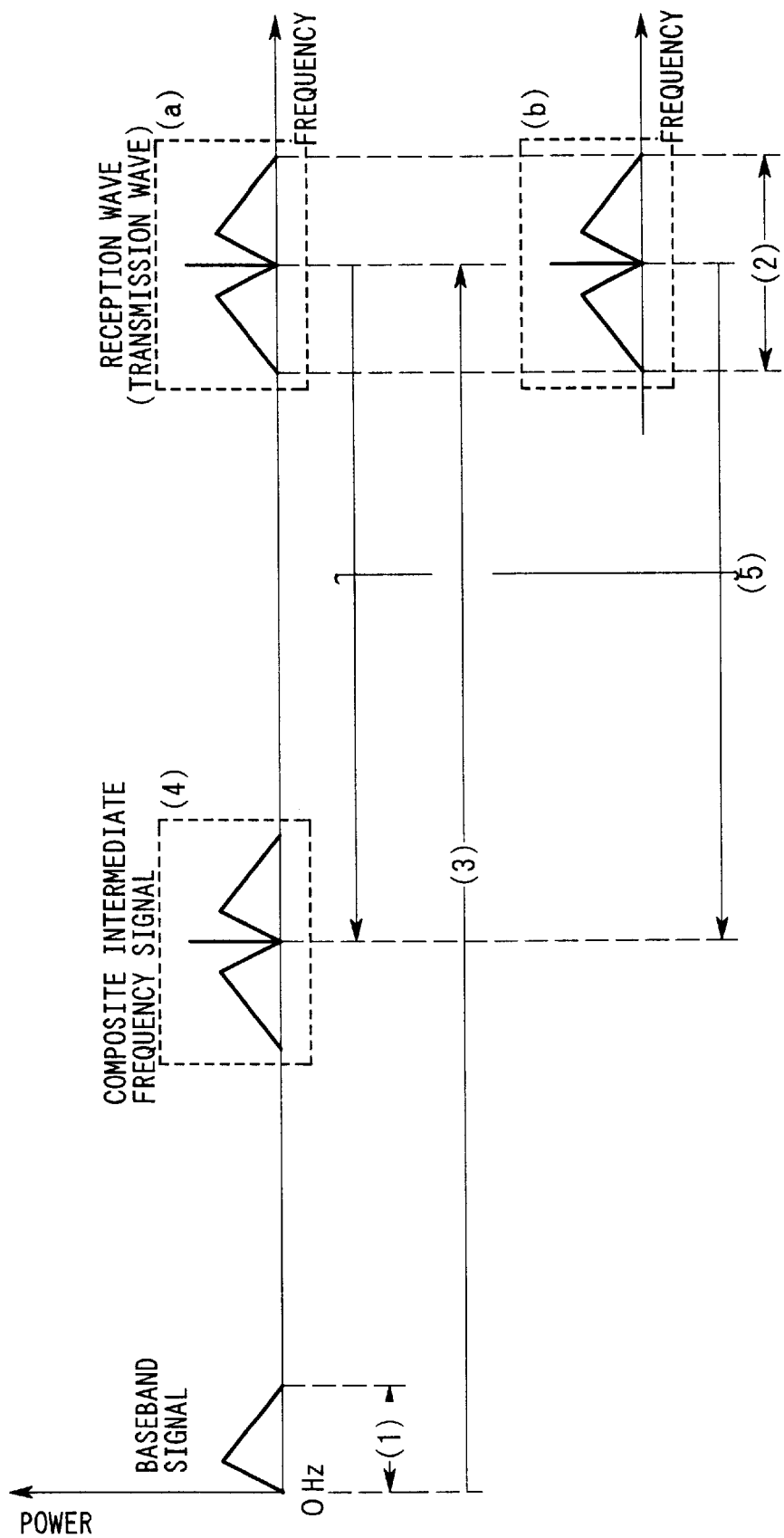
FIG. 3 is a chart showing the operation of the first embodiment.
Figure 4:
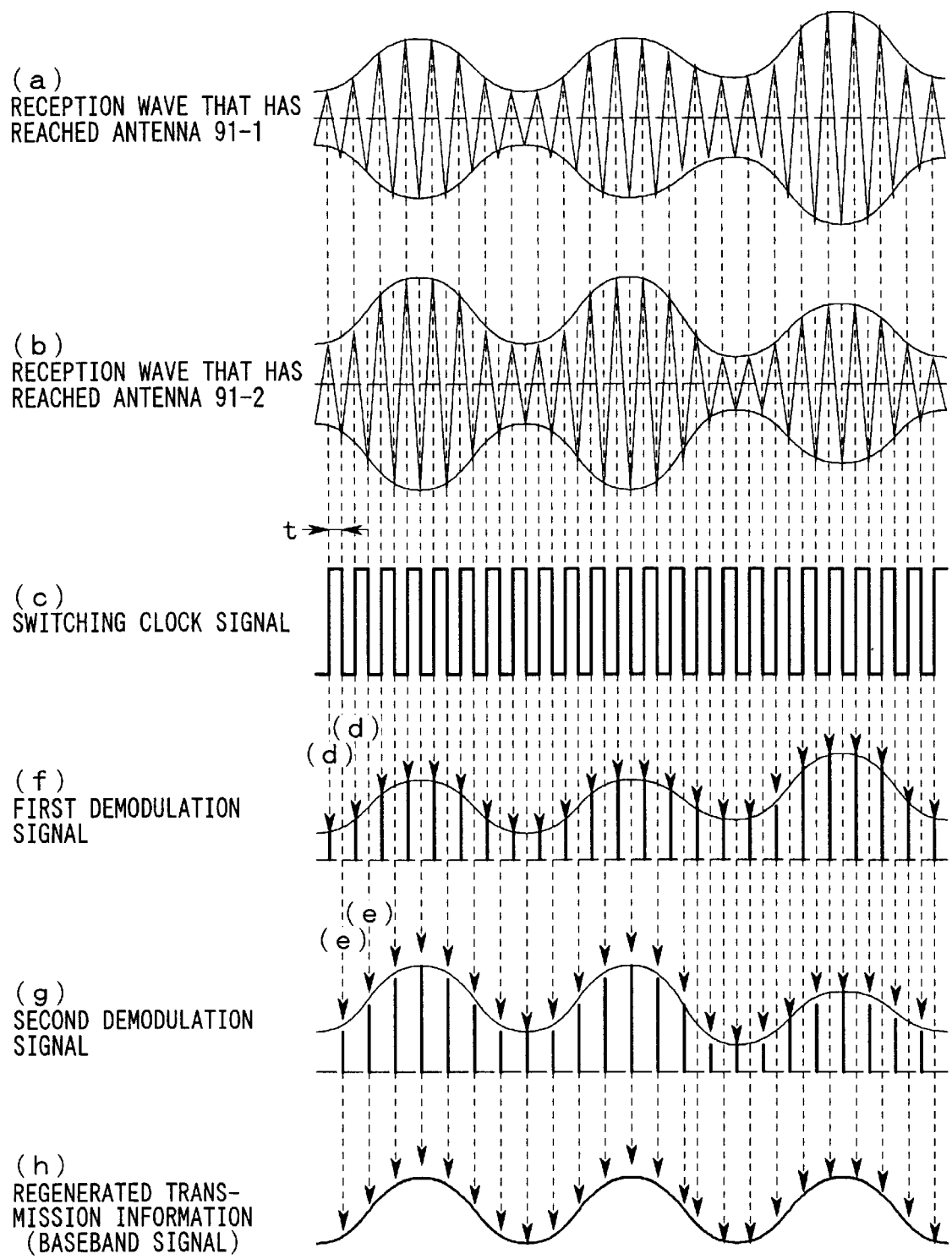
FIGS. 4 is a waveform diagram showing the operation of the first embodiment.

FIG. 3 is a chart showing the operation of the first embodiment of the invention, and FIG. 4 is a waveform diagram showing the operation of the first embodiment.

The operation of the first embodiment will be described below with reference to FIGS. 2 to 4.

A transmission wave that was generated by modulating (for simplicity, it is assumed here that amplitude phase shift keying was employed) a subcarrier signal having a known frequency (e.g., 4.8 kHz) in accordance with transmission information (indicated by symbol (1) in FIG. 3) and then frequency-converting (indicated by symbol (3) in FIG. 3) a modulated signal into a signal in a desired radio frequency band (e.g., a 400 MHz band; indicated by symbol (2) in FIG. 3) in a transmitting end reaches, as reception waves (i.e., radio-frequency signals of 400 MHz) (see FIGS. 3($a$ and 3($b$), FIGS. 4($a$) and 4($b$)), the antenna 91-1 and 91-2 in parallel via different radio transmission paths.

The oscillator 34 generates a reference signal having a fixed frequency that conforms to the above-mentioned modulation scheme, that is, the amplitude phase shift keying.

The switching controlling part 32 generates a switching clock signal (see FIG. 4($c$)) that is phase-synchronized with the reference signal and has a period t that is given by the following Equation (1) for a symbol period $T_s$ that conforms to the above-mentioned modulation scheme, an integer coefficient k (described later), and the total number b (=2) of branches formed by the respective antennas 91-1 and 91-2:

$$t = T_s/2bk \qquad (1)$$

For example, where the symbol period $T_s$ is 208 μs (=1/4.8 kHz) and both of the coefficient k and the total number b of branches are 2, the clock period t becomes 26 μs (=208×10$^{-6}$/(2 ×2×2)).

The switch 93 alternately selects a first reception wave reaching the antenna 91-1 and a second reception wave reaching the antenna 91-2 in accordance with the two logical values of the switching clock signal having the period of 26 μs (see FIGS. 4($d$) and 4($e$)).

The selection between the reception waves can easily be realized by using any of various devices that can switch at a rate of tens of megahertz such as pin diodes or GaAs FETs and that is commercially available.

The receiving part 94 accepts a composite signal generated as a sequence of instantaneous values of the first and second reception waves that have been selected alternately, and frequency-converts (indicated by symbol (5) in FIG. 3) the composite signal into an intermediate frequency signal (hereinafter referred to as "composite intermediate frequency signal"; indicated by symbol (4) in FIG. 3).

That is, the receiving part 94 generates a composite intermediate frequency signal of 455 kHz by frequency-converting reception waves of a 400 MHz band.

On the other hand, the clock generating part 33 generates a sampling clock signal that has a period T given by the following Equation (2) for a predetermined fixed natural number n (for simplicity, assumed to be 1) and the above-mentioned total number b and period t and that is phase-synchronized with the above-mentioned switching clock signal:

$$T=nbt \qquad (2)$$

In the above-described example, the sampling clock signal is a signal having a period of 26 µs.

The A/D converter 95 generates a digital signal (hereinafter referred to as "composite digital signal") by sampling instantaneous values of the composite intermediate frequency signal (of 455 kHz, for example) at the period (e.g., 26 µs) of the sampling clock and then coding the instantaneous values.

For example, AD6640 that is marketed by Analog Devices, Inc., has a wide-band analog input, and can A/D-converts, at high speed and at a resolution of 10 bits or more, a high-frequency signal of hundreds of megahertz that is supplied to the analog input can be used as the A/D converter 95.

However, in this embodiment, an A/D converter that has a lower response speed and smaller power consumption and is less expensive than AD6640 can be used as the A/D converter 95, because the frequency band of an input analog signal is a 455 kHz band and the sampling period is as long as 26 µs.

The demodulating part 31 generates two demodulation signals (see FIGS. 4(*f*) and 4(*g*)) by separating words that are included in the composite digital signal and represent the above instantaneous values in accordance with the logical values of the switching clock signal.

That is, instantaneous values of reception waves reaching the antennas 91-1 and 91-2 in parallel are selected alternately at a period that is shorter than or equal to a half of the symbol period $T_s$ at which the amplitude and the phase of the above-mentioned subcarrier signal are updated, combined and frequency-converted, and then converted, in the intermediate frequency domain, into a digital signal, which is then split into two demodulation signals.

Therefore, in this embodiment, two demodulation signals are regenerated by the receiving part 94, the A/D converter 95, and the demodulating part 31 that are commonly used for the first and second reception waves, as sequences of instantaneous values that can be restored in the intermediate frequency domain or the baseband domain according to the sampling theorem as indicated by Equations (1) and (2) and FIG. 4(*h*).

The branch selection (or combining processing) and the decision decoding to be performed according to a prescribed diversity scheme at a subsequent stage of the demodulating part 31 are realized reliably with desired accuracy as long as the GB product of the receiving part 94 and the responses of the A/D converter 95 and the demodulating part 31 are assured and the above-mentioned coefficient k, total number b, and natural number n are set properly.

Figure 5:
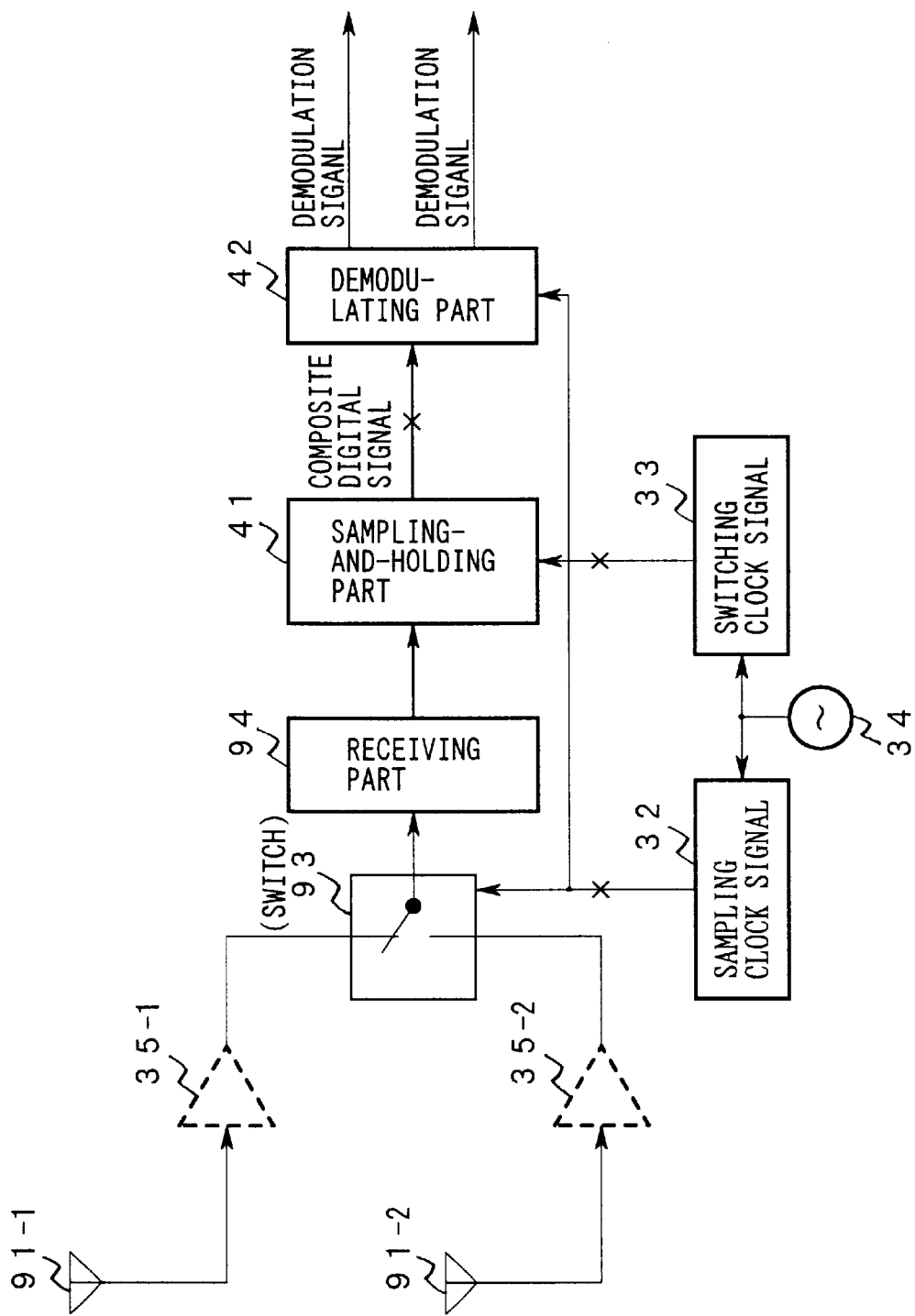
FIGS. 5 and 6 are block diagrams showing modifications similar to the first embodiment.

In this embodiment, two demodulation signals are regenerated by the demodulating part 31, according to the above-described processing in the digital domain. However, the invention is not limited to such a configuration. For example, a configuration shown in FIG. 5 is possible in which the A/D converter 95 is replaced by a sampling-and-holding part 41 that generates a composite digital signal by sampling instantaneous values of a composite intermediate frequency signal in synchronism with a sampling clock signal that is supplied from the clock generating part 33 and the demodulating part 31 is replaced by a demodulating part 42 that generates two analog demodulation signals by separating the instantaneous values of the composite digital signal in accordance with the logical values of a switching clock signal and performing prescribed low-pass filtering on resulting signals individually.

Figure 6:
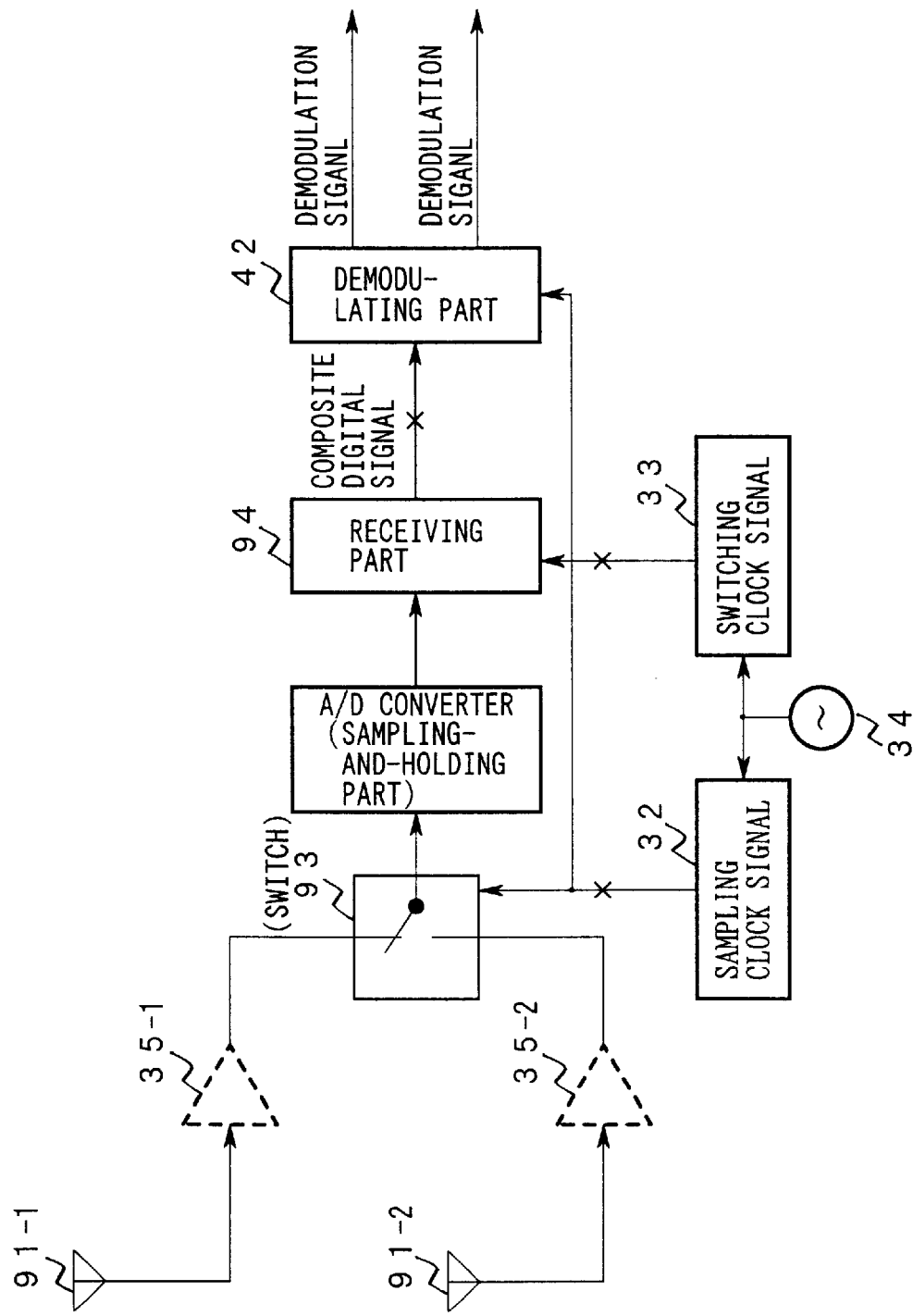

In this embodiment, the A/D conversion or sampling is performed in the intermediate frequency domain according to a sampling frequency that satisfies the sampling theorem or attains undersampling. For example, where the frequency of reception waves is so low that the setup time of the A/D conversion or sampling is secured, a configuration shown in FIG. 6 is possible in which an A/D converter or a sampling-and-holding part (halftone-meshed in FIG. 6) is disposed interstage between the switch 93 and the receiving part 94 and the receiving part 94 performs, as a digital signal processing, the above-described processing in the radio frequency domain.

In this embodiment, the above-mentioned natural number n is set at 1. However, the natural number n may be 2 or more when a plurality of instantaneous values that are given as a discrete signal in each switching cycle of the switching by the switch 93 are interpolated reliably according to the sampling theorem.

In this embodiment, the sampling clock signal is phase-synchronized with the switching clock signal. However, they need not be synchronized with each other when the sampling theorem holds and the decision decoding is realized with desired accuracy.

In this embodiment, the A/D conversion or sampling is performed in synchronism with the sampling clock signal. However, the invention is not limited to such a configuration. For example, time points when the A/D conversion or sampling is performed may be set indirectly in such a manner that the frequency conversion (including frequency synthesis to be described later) and the demodulation are performed according to a local frequency signal that is synchronized with the sampling clock signal.

In this embodiment, the composite signal is given in the analog domain or the digital domain and is A/D-converted (or sampled) at a frequency that satisfies the sampling theorem or attains undersampling after being converted into the intermediate frequency signal. However, for example, the A/D conversion or sampling may be performed directly in the baseband domain during the course of homodyne detection by the receiving part 94, whereby restrictions relating to the performance of the A/D converter 95 or the sampling-and-holding part 41 are relaxed and cost reduction is made.

Further, in this embodiment, the feeding points of the antennas 91-1 and 91-2 are directly connected to the corresponding contacts of the switch 93. However, where decrease in noise figure due to loss in the feeding paths of the antennas 91-1 and 91-2 and insertion loss of the switch 93 is not permitted, those feeding points may be connected to the contacts of the switch 93 via amplifiers 35-1 and 35-2, respectively, as indicated by broken lines in FIGS. 2, 5, and 6.

Figure 7:
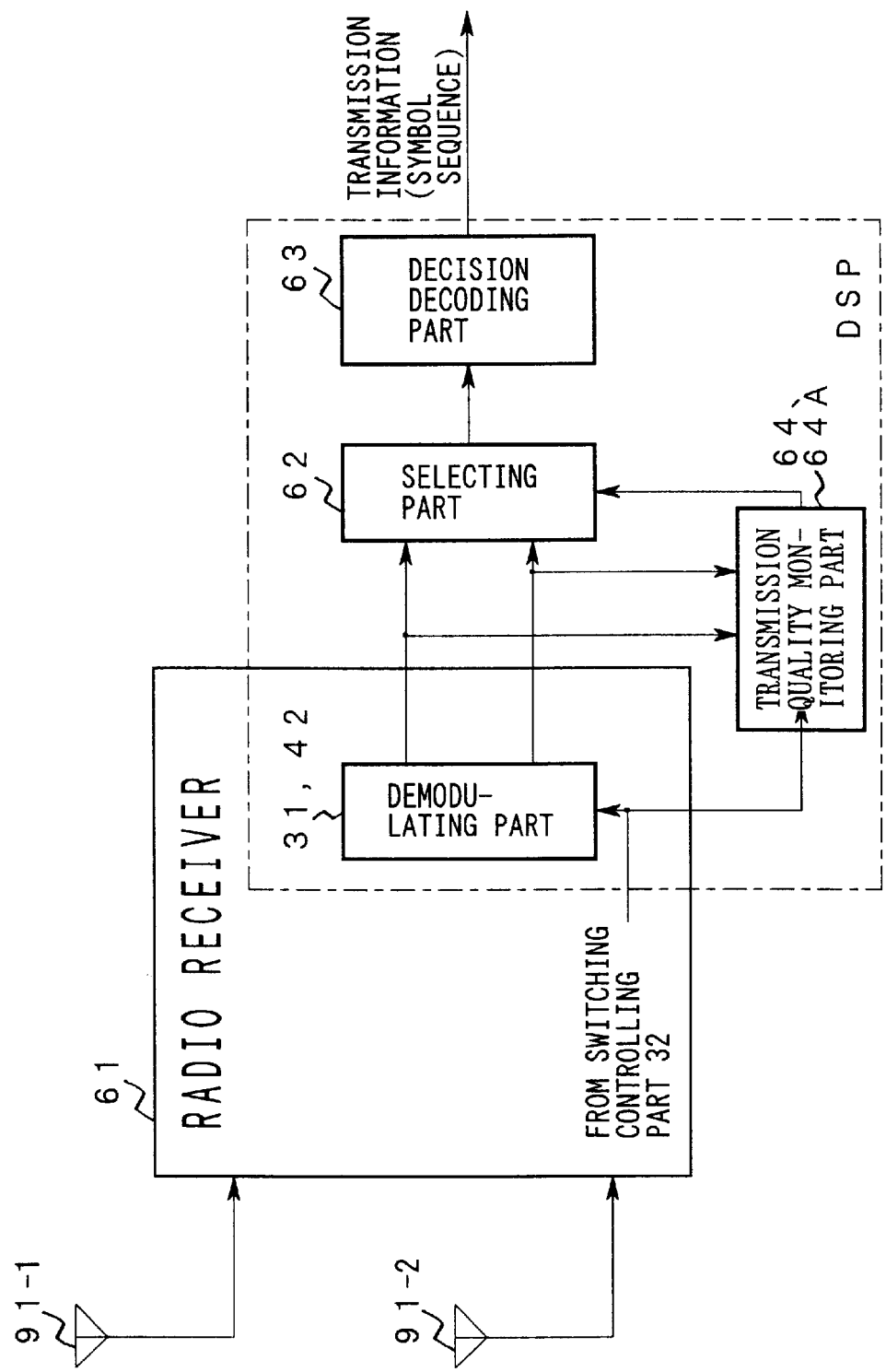
FIG. 7 is a block diagram showing second to fifth embodiments of the invention.

FIG. 7 is a block diagram showing second to fifth embodiments of the invention. The components in FIG. 7 that are the same in function and configuration as the corresponding components in FIGS. 2, 5, or 6 are given the same reference symbols as the latter and will not be described.

This embodiment is characterized by being provided with a radio receiver 61 according to the embodiment or modification shown in FIGS. 2, 5, or 6, a selecting part 62 that is directly connected to the two outputs of the demodulating part 31 or 42 as the final stage of the radio receiver 61, a decision decoding part 63 disposed in the subsequent stage of the selecting part 62, and a transmission quality monitoring part 64 that has a control terminal to which the output of the switching controlling part 32 of the radio receiver 61 is connected, a monitoring terminal to which the outputs of the demodulating part 31 or 42 are directly connected, and an output connected to the selection input of the selecting part 62.

The operation of the second embodiment will be described below.

The transmission quality monitoring part 64 distinguishes and accepts, in synchronism with the switching clock signal, demodulation signals that are supplied from the demodulating part 31 or 42 as sequences of combinations of an amplitude $\alpha$ and a phase $\phi$ of the above-mentioned subcarrier signal and that correspond to two respective reception waves reaching the antennas 91-1 and 91-2 in parallel.

The transmission quality monitoring part 64 computes levels $p_{i1}$ and $p_{i2}$ that are given by one of the following Equations (3) and (4) and maximum levels $P_{i1}$ and $P_{i2}$ that are given by the following Equation (5) for amplitudes $\alpha_{i1}$ and $\alpha_{i2}$ that are included in the respective demodulation signals at time i:

$$(p_{i1}, p_{i2}) = (\alpha_{i1}^2, \alpha_{i2}^2) \quad (3)$$

$$(p_{i1}, p_{i2}) = (\Sigma\alpha_{i1}^2, \Sigma\alpha_{i2}^2) \quad (4)$$

$$(P_{i1}, P_{i2}) = (\max[\ldots, \alpha_{(i-1)1}^2, \alpha_{i1}^2], \max[(\ldots, \alpha_{(i-1)2}^2, \alpha_{i2}^2]) \quad (5)$$

After computing the levels $p_{i1}$ and $p_{i2}$ or the maximum levels $P_{i1}$ and $P_{i2}$ the transmission quality monitoring part 64 outputs a selection signal that is one of the two demodulation signals supplied from the demodulating part 31 or 42 and the computed value of which is larger.

The selecting part 62 selects the one, of the two demodulation signals that are supplied from the demodulating parts 31 or 42, that is indicated by the selection signal.

Like the decision decoding part 97 of the conventional example, the decision decoding part 63 sequentially determines a symbol position that is a combination of an amplitude $\alpha$ and a phase $\phi$ (one of $(\alpha_{i1}, \phi_{i1})$ and $(\alpha_{i2}, \phi_{i2})$) given as the selected demodulation signal and that has a maximum likelihood in the signal space, and outputs, as transmission information, a sequence of symbols representing those symbol positions.

As described above, according to this embodiment, among the components of the radio receiver 61, the receiving part 94 is commonly used for the two branches formed by the respective antennas 91-1 and 91-2 and reception waves reaching the antennas 91-1 and 91-2 in parallel are subjected to digital signal processing after frequency conversion, whereby the reception waves are received with great exactitude according to the switching diversity scheme.

Therefore, a higher diversity gain than in the conventional example can be obtained without large increase in hardware scale.

Figure 8:
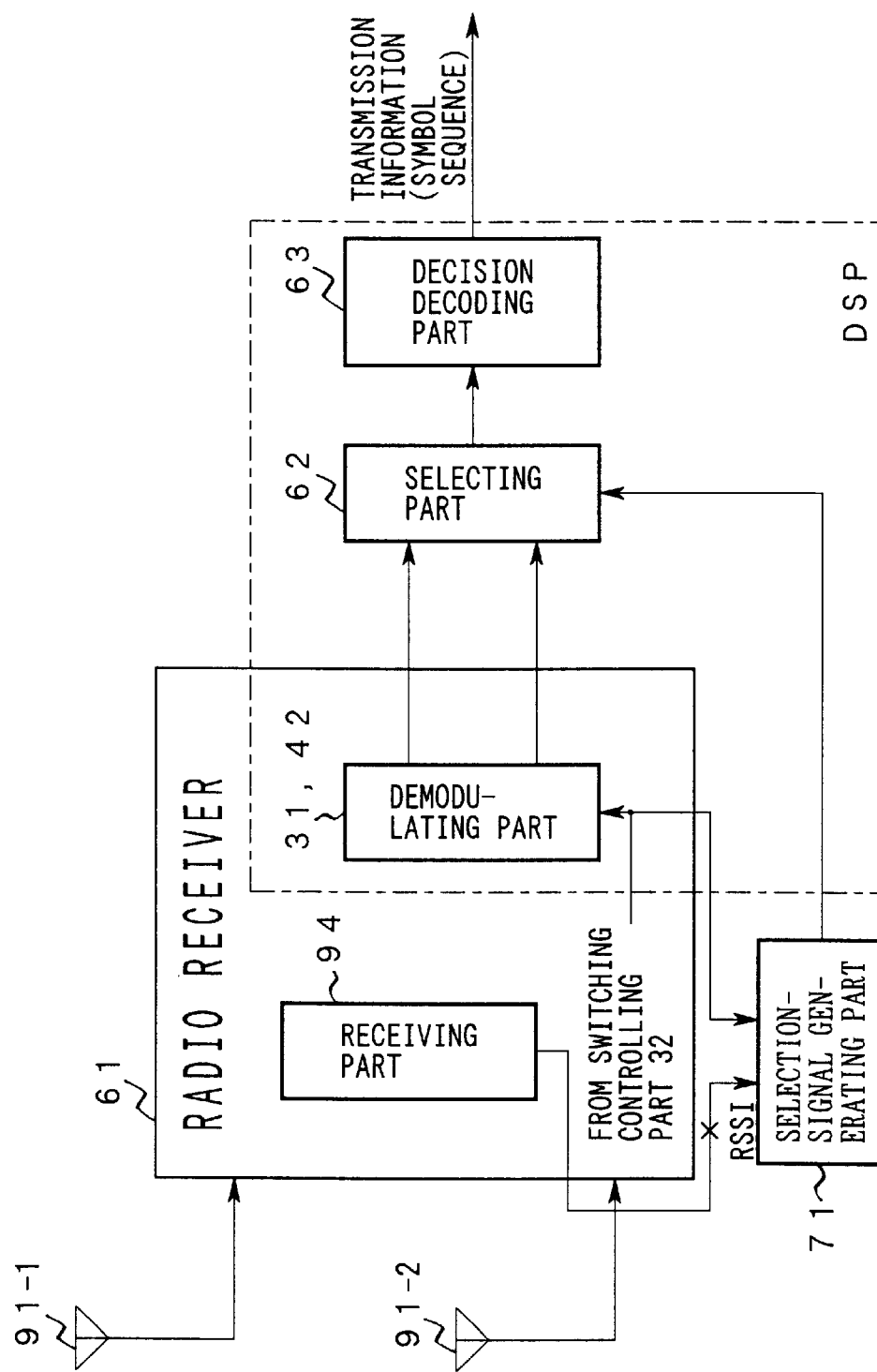
FIG. 8 is a block diagram showing the third embodiment of the invention.

FIG. 8 is a block diagram showing the third embodiment of the invention. The components in FIG. 8 that are the same in function and configuration as the corresponding components in FIG. 7 are given the same reference symbols as the latter and will not be described.

This embodiment is different from the embodiment shown in FIG. 7 in that a selection-signal generating part 71 is provided in place of the transmission quality monitoring part 64 and that the RSSI output of the receiving part 94, instead of the outputs of the demodulating part 31 or 42, is connected to the corresponding input of the selection-signal generating part 71.

The operation of this embodiment will be described below.

The receiving part 94 monitors the level of a composite signal (described above) and outputs an RSSI signal indicating the level.

The selection-signal generating part 71 recognizes levels L1 and L2 of reception waves reaching the respective antennas 91-1 and 91-2 by splitting the level indicated by the RSSI signal in accordance with the logical values of the above-mentioned switching clock signal.

Further, the selection-signal generating part 71 outputs a selection signal indicating one, of the reception signals reaching the respective antennas 91-1 and 91-2, that corresponds to a larger one of the levels L1 and L2.

Incidentally, in general, the instantaneous value of the RSSI signal becomes a steady value in tens of microseconds even when the difference between the levels of the two reception waves that are supplied alternately in accordance with the logical values of the switching clock signal has any value.

Therefore, according to this embodiment, reception of the transmission wave according to the switching diversity scheme can be achieved in the same manner as in the embodiment shown in FIG. 7 without the need for performing complex arithmetic operations of the above Equations (3)–(5) as long as the period t of the switching clock signal that is given by the above Equation (1) is sufficiently longer than tens of microseconds.

FIG. 9 is a block diagram showing the fourth embodiment of the invention.

The components in FIG. 9 that are the same in function and configuration as the corresponding components in FIG. 7 are given the same reference symbols as the latter and will not be described.

This embodiment is different from the embodiment shown in FIG. 7 in that delay equalizers 72-1 and 72-2 corresponding to the respective antennas 91-1 and 91-2 are additionally provided interstage between the demodulating part 31 or 42 and the selecting part 62, that an error detecting part 73 is provided in place of the transmission quality monitoring part 64, and that the monitoring outputs of the delay equalizers 72-1 and 72-2 are connected, instead of the outputs of the demodulating part 31 or 42, to the two inputs of the error detecting part 73.

The operation of this embodiment will be described below.

Each of the delay equalizers 72-1 and 72-2 is provided with a transversal filter (not shown) that performs delay equalization in accordance with coefficients that are varied according to a prescribed adaptive algorithm and a control section (not shown) that varies the coefficients of the transversal filter according to the adaptive algorithm and outputs a delay equalization error that has been obtained based on the coefficients.

The delay equalizers 72-1 and 72-2 suppresses transmission distortions that occurred in the radio transmission paths and outputs delay equalization errors (mentioned above) by performing delay equalization processing on two demodulation signals that are supplied from the demodulating part 31 or 42 in parallel and correspond to reception waves reaching the respective antennas 91-1 and 91-2.

The algorithm of the delay equalization processing is not a characterizing feature of the invention and can be realized by various known techniques, and hence is not described here in detail.

The error detecting part 73 accepts the delay equalization errors and outputs a selection signal indicating one, of the two demodulation signals, whose delay equalization error is smaller.

That is, according to this embodiment, the transmission quality is improved by performing the delay equalization processing in parallel on reception waves that are supplied via a plurality of branches, respectively, and one of the reception waves having a smaller delay equalization error obtained by the delay equalization processing is selected.

Therefore, a higher switching diversity gain than in the embodiments shown in FIGS. 7 and 8 can be obtained.

The fifth embodiment of the invention will be described below with reference to FIG. 7.

This embodiment is different from the second embodiment in that a transmission quality monitoring part 64A is provided in place of the transmission quality monitoring part 64.

The transmission quality monitoring part 64A distinguishes and accepts, in synchronism with the switching clock signal, two demodulation signals that are generated by the demodulating part 31 or 42 and supplied therefrom as sequences of combinations of an amplitude $\alpha$ and a phase $\phi$ of the above-mentioned subcarrier signal and that correspond to respective reception waves reaching the antennas 91-1 and 91-2 in parallel.

The transmission quality monitoring part 64A computes phase deviations $\delta\phi_{i1}$ and $\delta\phi_{i2}$ that are given by the following Equation (6) for combinations $(\alpha_{i1}, \phi_{i1})$ and $(\alpha_{i2}, \phi_{i2})$ of an amplitude $\alpha_i$ and a phase $\phi_i$ of the subcarrier signal that are contained in each of the two demodulation signals at time i:

$$(\delta\phi_{i1}, \delta\phi_{i2}) = (\phi_{i1}/\Phi_{i1}, \phi_{i2}/\Phi_{i2}) \quad (6)$$

where $\Phi_{i1}$ and $\Phi_{i2}$ are standard phases $\Phi_1$ and $\Phi_2$ representing symbol positions closest to coordinates in the signal space that are represented by the above respective combinations $(\alpha_{i1}, \phi_{i1})$ and $(\alpha_{i2}, \phi_{i2})$.

Further, the transmission quality monitoring part 64A computes, for the phase deviations $\delta\phi_{i1}$ and $\delta\phi_{i2}$, one of a set of maximum phase deviations $\Delta\phi_{i1}$ and $\Delta\phi_{i2}$ and a set of degrees of reliability $R_{i1}$ and $R_{i2}$ that are given by the following Equations (7) and (8), respectively:

$$(\Delta\phi_{i1}, \Delta\phi_{i2}) = (\max(\ldots, \delta\phi_{(i-1)1}, \delta\phi_{i1}), \max(\ldots, \delta\phi_{(i-1)2}, \delta\phi_{i2})) \quad (7)$$

$$(R_{i1}, R_{i2}) = ((1-\delta d_{i1}/D_{i1}), (1-\delta d_{i2}/D_{i2})) \quad (8)$$

In Equation (8), $\delta d_{i1}$ and $\delta d_{i2}$ are relative distances of two positions in the signal space that are given by the combinations $(\alpha_{i1}, \phi_{i1})$ and $(\alpha_{i2}, \phi_{i2})$ from symbol positions closest to these positions. $D_{i1}$ and $D_{i2}$ are distances of those respective symbol positions from the origin.

When the transmission quality monitoring part 64A has computed values of the phase deviations $\delta\phi_{i1}$ and $\delta\phi_{i2}$ or the maximum phase deviations $\Delta\phi_{i1}$ and $\Delta\phi_{i2}$ the transmission quality monitoring part 64A outputs, as a selection signal, binary information indicating one of the two demodulation signals supplied from the demodulating part 31 or 42 that has a smaller computed value.

However, when the transmission quality monitoring part 64A has computed values of the degrees of reliability $R_{i1}$ and $R_{i2}$, the transmission quality monitoring part 64A outputs a selection signal including the degrees of reliability $R_{i1}$ and $R_{i2}$ as well as binary information indicating one, of the two demodulation signals, that are supplied from the demodulating part 31 or 42, that has a larger computed value.

The selecting part 62 judges whether the selection signal that is output from the transmission quality monitoring part 64A includes degrees of reliability $R_{i1}$ and $R_{i2}$. When the judgment result is true, the selecting part 62 supplies the decision decoding part 63 with the degrees of reliability $R_{i1}$ and $R_{i2}$ as well as the two demodulation signals supplied from the demodulating part 31 or 42.

However, the judgment result is false, the selecting part 62 supplies the decision decoding part 63 with one, of the two demodulation signals that are supplied from the demodulating part 31 or 42, that is indicated by the binary information as the selection signal.

When supplied with only the demodulation signal from the selecting part 62, like the decision decoding part 97 shown in FIG. 10 the decision decoding part 63 sequentially determines, according to the above-mentioned modulation scheme, a symbol position that is a combination of an amplitude $\alpha$ and a phase $\phi$(one of $(\alpha_{i1}, \phi_{i1})$ and $(\alpha_{i2}, \phi_{i2})$) given as the selected demodulation signal and that has a maximum likelihood in the signal space, and outputs, as transmission information, a sequence of symbols representing those signal points.

However, when supplied with the degrees of reliability $R_{i1}$ and $R_{i2}$ as well as the two demodulation signals, the decision decoding part 63 performs decision decoding by using the degrees of reliability $R_{i1}$ and $R_{i2}$.

As described above, according to this embodiment, the single receiving part 94 among the components of the radio receiver 61 is commonly used for the two branches formed by the respective antennas 91-1 and 91-2, whereby reception waves reaching the respective antennas 91-1 and 91-2 are heterodyne-detected or homodyne-detected and switching diversity and decision decoding are reliably achieved in the digital domain.

Therefore, a higher diversity gain than in the conventional example can be obtained without large increase in hardware scale.

Although switching diversity is realized in each of the second to fifth embodiments, for example, any of co-phase combining, minimum dispersion combining, notch detection type MID combining, maximal-ratio combining, and other kinds of combining processing may be performed instead in one or both of the digital domain and the analog domain.

Each of the above embodiments does not specify values of the coefficient k and the natural number n. However, the coefficient k and the natural number n may be determined without taking into consideration all or part of the transmission bandwidth of a radio transmission channel of reception waves, the occupied bandwidth and the transmission rate of reception waves, and the frequency of the subcarrier signal as long as adaptation is made to the modulation scheme and the multiple access scheme used and a desired SN ratio and accuracy are secured.

In each of the above embodiments, reception waves are converted into an intermediate frequency signal or a baseband signal while the frequency spectrum of their sidebands are maintained. However, in the invention, frequency synthesizing processing in which one or both of the above frequency spectrum profile and the width of a band where the frequency spectrum distributes vary, may be performed instead of the frequency conversion processing as long as the demodulation and the decision decoding can be performed with desired accuracy.

In each of the above embodiments, the above-described processing is performed on reception waves generated according to π/4 differential QPSK. However, the invention is not limited to the case of using such a modulation scheme and can similarly be applied to reception waves generated according to any amplitude phase shift keying scheme or phase modulation scheme.

In each of the above embodiments, the scheme of the demodulation processing performed by the demodulating part 31 or 42 is not described in detail. However, the invention is applicable irrespective of whether quadrature demodulation and synchronizing detection (including quasi-synchronous detection) are performed during the course of such demodulation processing.

In each of the above embodiments, no disclosure is made of procedures of the selection (or combining), the decision decoding, and other kinds of processing performed in the digital domain in the demodulating part 31 or 42 and the subsequent stages. However, those kinds of processing can be realized by using various known techniques and are not characterizing features of the invention, and hence are not described in this specification.

In the invention, a VLDD (versatile linear digital demodulator; described in Japanese Unexamined Patent Application Publication No. Hei 9-149091, for example) that realizes demodulation processing as simple digital processing may be used to attain synergistically reduction in hardware scale, improvement in reliability, cost reduction, and downsizing and to obtain desired characteristics stably without any adjustments.

In each of the above embodiments, the invention is applied to the receiving system that is mounted on a mobile station of a mobile communication system and improves the transmission quality based on space diversity. However, the invention is not limited to such a mobile communication system or the case of using space diversity. The invention can be similarly applied to a receiving end of any radio transmission system based on frequency diversity or polarization diversity.

In each of the above embodiment, the period T of the sampling clock signal generated by the clock generating part 33 is given by the product of a natural number n and other factors (see Equation (2)). However, instead of the natural number n, an a number that is greater than or equal to 1 may be set as long as an event that instantaneous values of reception waves received by part of the branches are sampled a different number of times than those of reception waves received by the other branches as well as the degree of resulting increase of quantization noise or the degree of resulting deterioration in transmission quality is allowable.

The invention is not limited to the above embodiments and various modifications may be made without departing from the spirit and scope of the invention. Any improvement may be made in part or all of the components.

What is claimed is:

1. A radio receiver comprising:
   branch selecting means for accepting a plurality N of reception waves respectively reaching a plurality N of branches in parallel and for cyclically selecting the reception waves at a first frequency equal to a value of the product of a symbol frequency, the plurality N, and a prescribed number E equal to or greater than "2";
   sampling means for sequentially sampling, at a second frequency equal to or higher than said first frequency, the instantaneous values of said reception waves selected from said plurality N of reception waves by said branch selecting means and thereby outputting a sequence of instantaneous values; and
   splitting means for cyclically splitting, at said first frequency, said sequence of instantaneous values output from said sampling means and thereby outputting a sequence of instantaneous values individually corresponding to said plurality N of reception waves.

2. A radio receiver according to claim 1, further comprising digital converting means for converting in parallel said sequence of instantaneous values output from said splitting means into digital signals.

3. A radio receiver according to claim 2, wherein said sampling means samples said instantaneous values of reception waves selected by said branch selecting means in an intermediate frequency domain.

4. A radio receiver according to claim 1, wherein said branch selecting means selects said reception waves individually reaching said plurality N of branches in a radio frequency band or an intermediate frequency band.

5. A radio receiver according to claim 1, wherein said sampling means samples said instantaneous values of reception waves selected by said branch selecting means in a radio frequency domain.

6. A radio receiver according to claim 5, wherein said second frequency is equal to or lower than the frequency of a carrier signal of said plurality N of reception waves.

7. A radio receiver according to claim 1, wherein said sampling means samples said instantaneous values of reception waves selected by said branch selecting means in an intermediate frequency domain.

8. A radio receiver according to claim 7, wherein said second frequency is equal to or lower than the frequency of an intermediate frequency signal generated according to frequency conversion or frequency synthesizing processing on said reception waves selected by said branch selecting means.

9. A radio receiver according to claim 1, wherein said sampling means samples said instantaneous values of reception waves selected by said branch selecting means in a baseband domain.

10. A radio receiver according to claim 1, wherein said number E is set at a number that the accuracy of either or both of demodulation and decision decoding performed in parallel on said sequence of instantaneous values output from said splitting means is to be a desired value.

11. A radio receiver according to claim 1, further comprising a plurality N of amplifying means disposed at a prior stage of said branch selecting means and for individually amplifying said reception waves reaching said plurality N of branches.

12. A diversity receiver comprising:
   branch selecting means for accepting a plurality N of reception waves respectively reaching a plurality N of branches in parallel and for cyclically selecting the reception waves at a first frequency equal to a value of the product of a symbol frequency, the plurality N, and a prescribed number E equal to or greater than "2";
   sampling means for sequentially sampling, at a second frequency equal to or higher than said first frequency, the instantaneous values of said reception waves selected from said plurality N of reception waves by said branch selecting means and thereby outputting a sequence of instantaneous values;
   splitting means for cyclically splitting, at said first-frequency, said sequence of instantaneous values output from said sampling means and thereby outputting a sequence of instantaneous values individually corresponding to said plurality N of reception waves;

transmission quality monitoring means for analyzing said sequence of instantaneous values output from said splitting means, based on a modulation scheme applied for generating said plurality N of reception waves, and for obtaining the transmission qualities of said reception waves individually represented by said sequence of instantaneous values; and diversity processing means for selecting a sequence of instantaneous values having the maximum transmission quality obtained by said transmission quality monitoring means from said sequences of said instantaneous values output from said splitting means.

13. A diversity receiver according to claim 12, wherein said transmission quality monitoring means obtains, as said transmission qualities, the degrees of errors in the signal space appropriate to said modulation scheme applied for generating said plurality N of reception waves with regard to said sequences of said instantaneous values output from said splitting means.

14. A diversity receiver according to claim 12, wherein said transmission quality monitoring means obtains, as said transmission qualities, the levels of said reception waves selected by said branch selecting means.

15. A diversity receiver comprising:

branch selecting means for accepting a plurality N of reception waves respectively reaching a plurality N of branches in parallel and for cyclically selecting the reception waves at a first frequency equal to a value of the product of a symbol frequency, the plurality N, and a prescribed number E equal to or greater than "2";

sampling means for sequentially sampling, at a second frequency equal to or higher than said first frequency, the instantaneous values of said reception waves selected from said plurality N of reception waves by said branch selecting means and thereby outputting a sequence of instantaneous values;

splitting means for cyclically splitting, at said first frequency, said sequence of instantaneous values output from said sampling means and thereby outputting a sequence of instantaneous values individually corresponding to said plurality N of reception waves; and diversity processing means for combining said sequence of instantaneous values, output from said splitting means, with weighting based on a prescribed sensing technique or navigation technique and thereby obtaining a single sequence of instantaneous values.

* * * * *